United States Patent [19]

Patel

[11] Patent Number: 4,522,848

[45] Date of Patent: Jun. 11, 1985

[54] PROCESS OF PREPARING A RECORDING MEMBER HAVING A VARIABLE THICKNESS RECORDING LAYER

[76] Inventor: Pravin K. Patel, 7206 W. 78th St., Los Angeles, Calif. 90045

[21] Appl. No.: 489,370

[22] Filed: Apr. 28, 1983

[51] Int. Cl.³ ............................................. H01F 10/02
[52] U.S. Cl. .................................. 427/131; 427/132; 427/287
[58] Field of Search ...................... 427/131, 132, 287

Primary Examiner—Bernard D. Pianalto

Attorney, Agent, or Firm—K. H. Boswell; Edward D. O'Brian

[57] ABSTRACT

A magnetic recording disk is constructed wherein a disk substrate is overlayed with at least one non-recording layer. A recording layer is then overlayed on the non-recording layer with the thickness of the recording layer at those areas corresponding to the inner track zone located toward the central hub area of the disk being thinner than the intermediate track zone radially displaced outwardly from the inner track zone toward the periphery of the recording disk.

6 Claims, 7 Drawing Figures

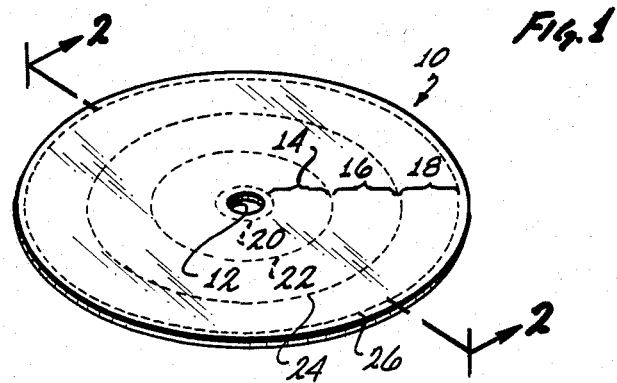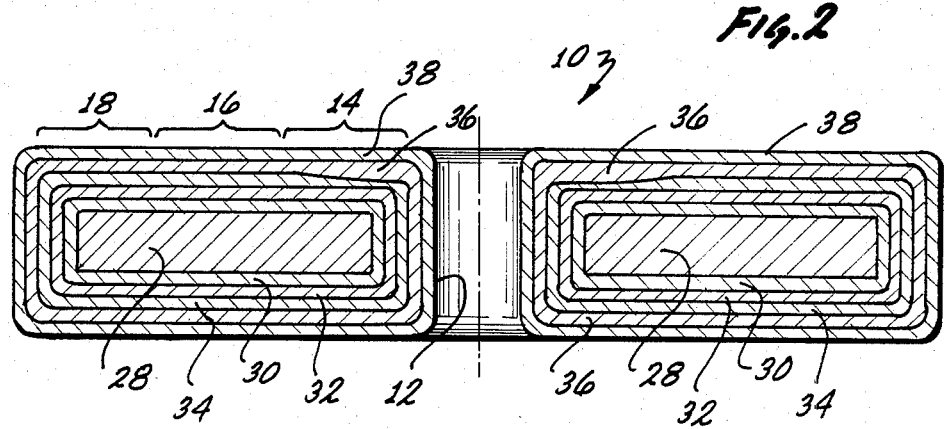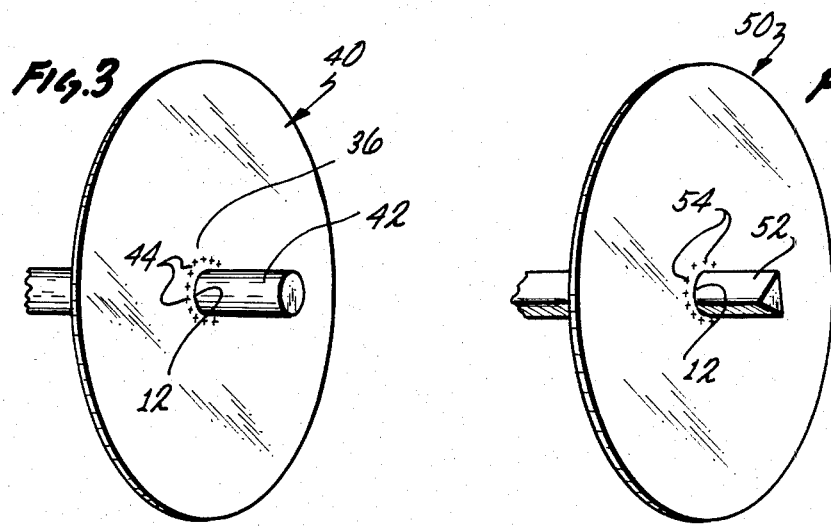

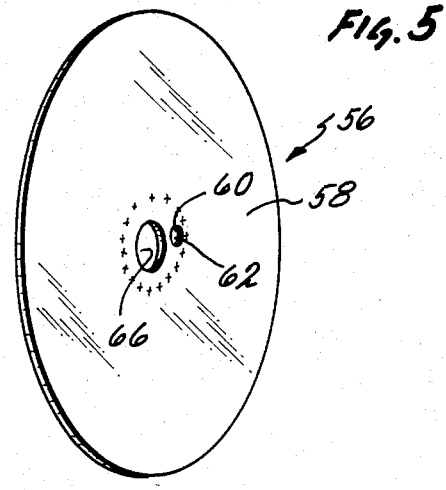
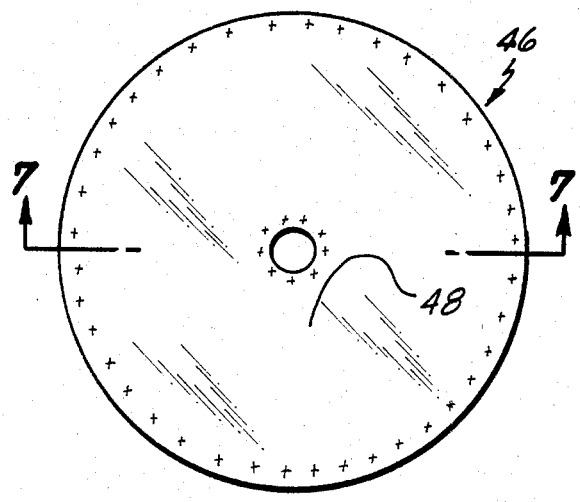
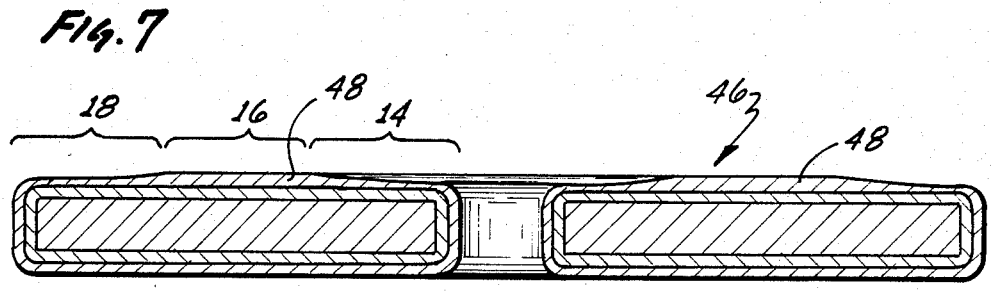

PROCESS OF PREPARING A RECORDING MEMBER HAVING A VARIABLE THICKNESS RECORDING LAYER

BACKGROUND OF THE INVENTION

This invention is directed to a magnetic recording disk and a process of preparing the same wherein the thickness of the recording layer at the inner track zone or the area of the disk displaced toward the central hub of the disk is thinner than the thickness of the recording layer radially displaced outwardly from this inner track zone. During construction of the disk a positive charge is induced onto those areas which will correspond to the inner track zone of the recording layer by contact of these areas with an anodic metal which is more electropositive than any metal component of the recording layer.

In the computer industry for the storage of large amounts of material in the computer industry disks containing magnetic recording layers are routinely used. Recent advances in the technology associated with the use of these disks has resulted in achieving higher and higher bit densities on smaller disks. Routinely, presently, five inch disks now are utilized where 14" disks were used in the past. The use of these smaller diameter disks are the direct result of increases in the bit density on the recording layers of the disks.

It is know that the use of thinner film thicknesses for the recording layer results in achievement of higher bit densities. This is especially true at higher frequencies wherein the thinner the film thickness of the recording media the higher the output of the bits recorded thereon.

The recording disks are spun under a transducer or recording head. Present technology allows the placement of the recording head at a flight height approaching zero with respect to the uppermost layer of the disk. Because the flight height of the recording head does approach contact with the surface of the recording disk recording disks prepared such as those in U.S. Pat. No. 4,224,381 for which I am a co-inventor, are used to prevent catastrophic loss of the recorded media on that disk when contact is made between the recording head and the upper surface of the disk.

The bits density recorded on the recording layer of a disk are located in tracks which extend outwardly from the center or hub area of the disk toward the outside periphery of the disk. Because the disk is round and because the center of rotation of the disk is at the center of the disk the velocity of the disk movement underneath the recording head is less at the inner tracks which have a smaller radius from the center of the disk than it is with respect to the outer tracks which are at a larger radius from the center of the disk. Additionaly, the track length at the inner tracks is much smaller than the track length at the outer tracks. Because the track length at the inner tracks is less than the track length at the outer tracks there is a higher bit packing density at the inner tracks with respect to the outer tracks. Because the bit density is higher at the inner tracks the output at the inner tracks is different from the output at the higher tracks.

In order to have a consistant interrelationship between the recording head and the recording disk it would be desirable to have a consistant output from both the inner and the outer recording tracks as well as all intermediate tracks between the same. In known recording disks it has heretoafore been impossible to achieve this consistant output because all heretoafore known magnetic recording disks have sought to achieve a consistant film thicknesses of all the layers constituting the disks including the recording layer.

BRIEF DESCRIPTION OF THE INVENTION

In view of the above it is a broad object of this invention to prepare a magnetic recording disk which approaches constistant output between the inner zone tracks and the outer zone tracks. It is a further object of this invention in view of the higher bit density packing at the inner zone track to achieve a higher coercivity at the inner zone tracks with respect to those zone tracks which are radially displaced outwardly from the inner zone tracks. Further, it is an object of this invention to prepare magnetic recording disks which because of the process of preparation of the same are ecomonically produced and thus are ecomonically available to the consumer of the same.

These and other objects as will become evident from the remainder of this specification are achieved by producing magnetic recording disks wherein the thickness of the recording layer at the inner zone tracks is less than the thickness of the recording layer at other zone tracks which are radially displaced outwardly from the inner zone tracks. These objects are achieved in a magnetic recording disk which comprises: a disk substrate, said disk substrate having a central hub area, a circumferential rim area and an intermediate area located between said hub area and said rim area; at least one non-recording layer located on said substrate layer overlaying said hub area, said intermediate area and said rim area; a magnetic recording layer located on said non-recording layer, said magnetic recording layer having an inner track zone overlaying said hub area, an intermediate track zone overlaying said intermediate area and an outer track zone overlaying said rim area, the thickness of said recording layer inner track zone being less than the thickness of said recording layer intermediate track zone.

Further, these objects are achieved in a process of preparing a magnetic recording disk which comprises: electrolessly depositing upon a disk shaped substrate a metal containing non-recording support layer; contacting said support layer with an anodic metal, said anodic metal comprising a metal which is more electropositive than cobalt, said support layer contacted at an area proximal to that area which will underlay the inner track zone of said recording disk, said contact with said anodic material producing an area of positive charge at said area of said support layer which will underlay said inner track zone; electrolessly depositing upon said support layer a cobalt containing recording layer, the thickness of said cobalt containing recording layer at said area of positive charge being less than the thickness of said cobalt containing recording layer overlaying the remainder of said support layer.

The magnetic recording disks of the invention, in addition to having the recording layer being thinner near the inner track zone, can also include other layers located beneath or above the recording layer with respect to the substrate of the disk. As such, magnetic layers and shield layers can be located between the substrate disk and the recording layer and further barrier layers and protecting layers can be located over the recording layer.

Because the velocity of the disk with respect to the recording head increases when the recording head is located over the outer track zone the flight height of the recording head also increases. In an alternate embodiment of the invention the thickness of the recording layer at the outer track zone can be made thinner with respect to the thickness of the recording layer at intermediate track zone in order to improve output characteristics in large diameter disks wherein the radius of the outer track zone is substantially greater than the radius at the inner track zone.

Preferably the film thickness of the magnetic recording layer at the inner track zone would be from about 5% to about 20% less than the film thickness of the recording layer at intermediate track zones. A more preferred range for the thickness of the recording layer at the inner track zone would be from about 10% to about 15% less than the thickness of the recording layer at intermediate track zones.

In the preferred process of preparing the magnetic recording disk of this invention electroless depositing of the individual layers upon a disk substrate is performed. After electrolessly depositing any nonrecording layers which will underlie the recording layer the layer immediately underlying the recording layer is then contacted with an anodic material at the area wherein it is desirable that the recording layer be desposited thinner than in other areas. The material chosen for the anoid is selected to be a more electropositive metal than metallic elements in the recording layer. In the preferred embodiment wherein cobalt is utilized for the metallic element in the recording layer the material selected for the anode would thus be a material which is more electro-positive than cobalt. Preferably, when the cobalt is utilized as the metallic element within the recording layer aluminum and zinc are chosen as the anodic material.

When the layer which immediately underlies the recording layer is contacted with the anodic material a positive charge is induced in this underlying layer at the point of contact with the anodic material. When the layer immediately underlying the recording layer is so contacted the positive charge will tend to disperse itself in a circular manner from the point of contact. Thus only a single point of contact need be made, however, it has been found that if a mandrel formed out of the anodic material is used to support the disk during the electroless depositing of the recording layer when such a mandrel is utilized the mandrel contacts the partially made recording disk at a plurality of points of contact. This results in a preferred dispersement of the positive charge.

Alternatively to utilizing an independent anode for inducing the positive charge on the partially prepared magnetic recording disk, the disk substrate itself can be utilized as this anode. Thus, an opening can be formed in all layers lying between the disk substrate and the recording layer prior to electrolessly depositing the recording layer thereon to expose the disk substrate preferably aluminum, and induce a positive charge at the area of exposure of the disk substrate.

If a reduction in the thickness of the recording layer is desirable at both the inner zone tracks and the outer zone tracks, the partially prepared recording disk can be contacted with an anodic material at the area corresponding to both the inner zone tracks and the outer zone tracks. Thus two areas of positive charge will be induced on the layer which will immediately underlie the recording layer. As with a single area of positive charge the disk substrate can also be utilized to achieve these two areas of positive charge at both the inner and outer zone track areas by exposing a portion of the disk substrate, preferably aluminum, at both of these zone areas.

BRIEF DESCRIPTION OF THE DRAWINGS

This invention will be better understood when taken in conjunction with the drawings wherein:

FIG. 1 is an isometric view of a typical magnetic disk produced as per the teachings of this invention;

FIG. 2 is a side elevational view in section taken about the line 2—2 of FIG. 1, however, the vertical dimension is grossly exagerated with respect to the horizontal dimension in order to illustrate certain features of the invention related to the vertical dimension which are of a smaller scale than the horizontal dimension of the invention;

FIG. 3 is an isometric view of a typical magnetic recording disk of the invention supported on a first mandrel and including a diagramatic representation of positive electrical charges induced onto the magnetic recording disk by the mandrel;

FIG. 4 is a view similar to FIG. 3 except the shape of the mandrel has been modified with respect to that seen in FIG. 3;

FIG. 5 is a view similar to FIG. 3 except a mandrel has been eliminated and in its stead a portion of the substrate of the magnetic recording disk has been exposed through a small opening;

FIG. 6 is an elevational view of a partially formed magnetic recording disk showing diagramatically a distribution of an electrical charge different from the distribution seen in FIGS. 3 through 5;

FIG. 7 is a side elevational view in section about the line 7—7 of FIG. 6.

The invention described in this specification and illustrated in the drawings utilizes certain principals and/or concepts as are set forth in the claims appended to this specification. Those skilled in the arts to which this invention pertains will realize that these principals and/or concepts are capable of being expressed in a variety of embodiments differing from the exact embodiment utilized for illustrative purposes herein. For this reason this invention is to be construed as being limited only in light of the claims and is not to be construed as being limited to the exact illustrative embodiments.

DETAILED DESCRIPTION OF THE INVENTION

As is pointed out in U.S. Pat. No. 4,224,381 for which I am a co-inventor, the entire disclosure of which is herein incorporated by reference, in general the higher the frequency of a signal supplied by a recording head to a magnetic recording disk the more desirable it is to utilize a recording layer which is thin. Furthermore, as was pointed out above, the higher the bit density at any particular recording track the more desirable it is to utilize a thinner recording layer on a magnetic recording disk. With the trend in the computer industry to go to higher frequencies for their recording heads, the need for thinner and thinner recording disks is increased, however, there is a feedback mechanism between the computer industry and the magnetic recording industry in that as the makers of magnetic recording disks achieve thinner and thinner recording layers the computer industry is able to utilize higher frequencies for the recording heads. In any event currently with the continued explosion of computer use and other applications of magnetic recording disks the need has risen for better and more reliable disks.

During the early growth period of the magnetic recording disk industry uniformity of the composition and the thickness of the different layers of the magnetic recording disks was sought. However, with the shift to the utilization of higher recording frequencies for the recording head, the production of a uniformly dimensioned recording layer leads to variability in the coercivity between the inside and the outside tracks of the recording disks. Typically a presently produced magnetic recording disk having a magnetic recording layer of a uniform thickness will experience a difference in the output between the inside diameter recording tracks and the outside diameter recording tracks. For instance in a typical five inch disk at one and one half inches measured from the exact center of the disk an output of approximately 1.5 millivolts is obtained while at 4.7 inches from the center of the disk the output will be in the neighborhood of 10 millivolts.

The present invention is directed to a magnetic recording disk wherein the thickness of the recording layer is reduced at specific zones compared to other zones so as to normalize the output of all of the zones.

FIG. 1 shows a typical magnetic recording disk 10. The disk contains a center cutout hole 12 allowing for appropriately mounting of the finished disk upon a spindle (not shown or numbered) for use in storing and retreaving data onto and from the magnetic recording disk 10. A recording head (also not shown or numbered) is utilized in conjunction with the disk 10 with the recording head serving as the input and output of signals to the disk 10 for the transfer of information between the disk 10 and a suitable electronic appliance such as a computer or the like.

Information is stored on the magnetic recording disk 10 by introducing magnetic signals onto the disk 10 which are located in circular tracks. For the purposes of this specification the particular tracks wherein the magnetic information is stored can be divided into an inner track zone 14, an intermediate track zone 16 and an outer track zone 18. The exact radial dimensions from the center of the magnetic recording disk 10 of these particular zones 14, 16 and 18, of course, would depend upon the dimensions of the magnetic recording disk 10 itself. Disk size range anywhere from three inches minimum to approximately three feet maximum. More commonly, however, the disk would range from about five inches to fourteen inches.

In FIG. 1 the dotted lines 20 and 22 generally delineate the inner track zone 14 with the dotted lines 22 and 24 generally delineating the intermediate track zone 16 and the dotted line 24 and the periphery of the disk 26 generally delineating the outer track zone 18. Depending upon the ultimate usage of the disk a cut-out hole such as cut-out hole 12 may or may not be present. Additionally, other locating holes may be located near the center of the magnetic recording disk 10 as would be appropriate for the particular disk drives which would be utilized to rotate the particular disk. In any event, for the purposes of this specification the magnetic recording disk 10 can be divided into these three zones 14, 16 and 18 as delineated above.

In FIG. 2 the magnetic recording disk 10 shown in FIG. 1 is shown in a sectional side elevational view, however, the view has been modified with respect to the ratio of the vertical thickness with respect to the horizontal diameter of the magnetic recording disk 10. For the purposes of illustration of the drawings the thickness of the magnetic recording disk 10, that is, the vertical dimension has been grossly exaggerated with respect to the diameter of the magnetic recording disk 10 that is the horizontal direction. In actual reality while the magnetic recording disk 10 may be measured in inches with respect to its diameter the thickness of the individual layers grossly exaggerated in FIG. 2 would be on the order of micro-inches.

The designation of the inner track zone 14 to intermediate track zone 16 and the outer track zone 18 has been carried over from FIG. 1 to FIG. 2.

A typical disk utilizing the principals of this invention can be constructed as follows. A substrate 28 forms the foundation for the magnetic recording disk 10. Overlayed on the substrate 28 is a magnetic layer 30. Overlayed on the magnet layer 30 is a shield layer 32. Overlayed on the shield layer 32 is a recording layer 34. Overlayed on the recording layer 34 is a barrier layer 36. And overlayed on the barrier layer 36 is an outermost layer of the magnetic recording disk 10 the protective coating 38.

For the purposes of this specification the substrate 28, magnetic layer 30, shield layer 32 and recording layer 34 would be formed essentially as is described in U.S. Pat. No. 4,224,381 for which I am co-inventor. The entire contents of that patent as was previously noted are herein incorporated by reference. For the recording layer 34, the barrier layer 36 and the protective coating 38 reference is made to U.S. Pat. No. 4,124,736 of which I am also a co-inventor. The entire contents of that patent are also herein incorporated by reference. For the purposes of this specification the particular layers 30, 32, 34, 36 and 38 would be formed preferrably by electroless depositing techniques as are outlined in U.S. Pat. Nos. 4,224,381 and 4,124,736. The particular compositions of the individual layers would be also as outlined in these two referred to patents.

Contrary, however, to the disclosures of U.S. Pat. Nos. 4,224,381 and 4,124,736 the recording layer 34 would not be formed as a layer having a uniform thickness across the entire surface of the magnetic recording disk 10. Instead the thickness of the recording layer 34 would be varied such that at certain zones as hereinafter described the thickness of the recording layer 34 would be thinner than the thickness of the recording layer 34 at other zones.

For the purposes of illustrating this invention cobalt is considered to be the preferred material constituting the composition forming the recording layer 34. Typically for thin film recording layers presently preferred for the recording of high bit density the thickness of the recording layer would be on the order of several micro-inches as for instance two micro-inches. Thicker recording layers, however, also could be utilized with the thickness of the recording layer adjusted with regard to the frequency of the signal of the recording head. Preferrably the magnetic layer 30 would be pure cobalt, however cobalt alloyed with amounts of nickel or other elements compatable with cobalt for use in recording layers could also be utilized. In my U.S. Pat. No. 3,719,525, the entire contents of which are herein incorporated by reference, I described the use of a cobalt phosphorus alloy for a recording layer. Other alloys are also known in the art for the preparation of suitable recording layers. In any event preferrably the cobalt based recording layer would be appropriately electrolessly deposited upon subsequent underlying layers such as the shield layer 32 of FIG. 2.

While it is preferred to deposit a magnetic layer 30 overlayed with a shield layer 32 directly underneath the recording layer 34 as per the teachings of U.S. Pat. No. 4,224,381 noted above, the protocol utilizing the particular layers 30 and 32 need not be exactly followed. In any event one or more additional underlying non-recording layers can be introduced between the substrate 28 and the recording layer 34.

For the purposes of preparing the magnetic recording disk 10 preferably aluminum is chosen for the substrate 28. The aluminum substrate 28 can be overcoated with a zinc coating as per the teachings of U.S. Pat. No. 4,224,381 for the desirable properties resulting from such a zinc overcoating or the substrate 28 can be utilized without such an appropriate coating. As will be noted in referring to FIG. 5 below if the substrate 28 is a more electro-positive metal than the metal forming the recording layer 34 the desired differential in the thickness of the recording layer 34 of this invention can be achieved utilizing the substrate 28 as an anode to induce a electrical charge onto particular zone areas of the partically formed magnetic recording disk 10.

Any layer which overlay the recording layer 34 such as the barrier layer 36 or the protective layer 38 should be of such a non-magnetic character that it does not influence the magnetic character of the recording layer 34. Typical of such overlaying layers would be those as described in U.S. Pat. 4,124,736. As with the layers which underlie the recording layer 34 those layers which overlay the recording layer 34 preferrably would be formed by electroless depositing of the same upon the recording layer 34.

As is evident in reviewing FIG. 2 the thickness of the recording layer 34 at the inner track zone 14 which is located adjacent to the central hub area or the cut-out hole 12 of the magnetic recording disk 10 is less than the thickness of the recording layer 34 radially displaced outwardly at the intermediate track zone 16. The reduction in the thickness in the recording layer 34 at the inner track zone 14 compensates for the increase in bit density at the inner track zone 14 resulting from the lower velocity of the inner track zone 14 compared to zones radially displaced outwardly from it upon rotation of the magnetic recording disk 10. This increases the output at the inner track zone 14 to compensate for the increase of bit density resulting from the circular geometry of the magnetic recording disk 10. Because the recording layer 34 is thinner at the inner track zone 10 its coercivity is higher at these zones resulting in better performance of the magnetic recording disk 10.

The decrease of thickness of the recording layer 34 at the inner track zones as well as other zones as herein after explained can be achieved by contacting the partially formed magnetic recording disk 10 just prior to or during the electroless depositing of the recording layer 34 thereon. By contacting the partially formed magnetic recording disk 10, such as a partially formed magnetic recording disk 10 having both a magnetic layer 30 and a shield layer 32 are already deposited thereon, with a metallic material which is more electro-positive than the outermost layer on the partially formed magnetic recording disk 10 a positive charge is created at the area of contact. Thus, for instance, in FIG. 3 a partially formed disk 40 is mounted upon a mandrel 42 such that contact is made between the mandrel 42 and the surface of the barrier layer 36 which is located at the cut-out hole 12. The mandrel 42 is chosen such that it is a metal which is more electro-positive than the material which will comprise the recording layer 34. For recording layers 34 based upon the use of cobalt, suitable materials for the mandrel 42 would be aluminum, zinc or other such anodic metals which are higher up (located toward the anodic end) in the electromotive series of metals and alloys.

Upon contact of the plurality formed disk 40 with the anodic metal a positive electrical charge such as that depicted by the numeral 44 in FIG. 3 is distributed in the immediate vicinity of the contact between the mandrel 42 and the partially formed disk 40. Upon placement of the partially formed disk 40 into an appropriate solution for electroless depositing of the recording layer 34, the presence of the positive charge 44 at the area which will underlie the inner track zone 14 suppresses the initial depositing of the recording layer 34 at this area. An initial deposit of material which will form the recording layer 34 starts in those areas wherein the positive charge 44 is not located such as the intermediate track zone 16 and the outer track zone 18. Upon continous depositing of the recording layer 34 onto the partial formed disk 40 eventually the positive charge 44 is overcome and material starts to deposit at this area also. The recording layer 34 which is deposited at the inner track zone 14, since its depositing was suppressed, ultimately is thinner than those areas wherein depositing of the material forming the recording layer 34 occured for a longer period of time. This results in a somewhat concave upper surface for the recording layer 34 wherein the radius of curvature of this concave upper surface is measured in angstroms. While the actual differences in the thickness of the recording layer 34 at zones 14 and 16 is small it is, however, sufficient to compensate for the increase bit density which will occur at the inner track zone 14.

Because of the presence of the positive charge 44 wherein the anodic material contacts the partially formed disk 40 the plating of the recording layer 34 is initially retarded and the recording layer 34 plates from the outside toward the center of the partially formed disk 40. In certain instances it may be desirable to have both the inner track zone 14 and the outer track zone 18 of a reduced thickness compared to the intermediate track zone 16 and as such as seen in FIG. 6 a positive charge can be induced at both the inner track zone 14 and the outer track zone 18. In this case plating is retarded at both of these areas with respect to the intermediate track zone 16 resulting in the formation of a recording layer 34 which has a reduced thickness at both the inner track zone 14 and the outer track zone 18. In FIG. 7 such a disk is shown. For FIG. 7 the partially formed disk 46 has a recording layer 48 located thereon which has a reduced thickness at both the inner track zone 14 and the outer track zone 18.

The production of such a disk as is depicted in FIGS. 6 and 7 would be desirable in those instances wherein the ultimate magnetic recording disk 10 produced would be of a large diameter such that there would be an extensive difference between the track speed at the inner track zone 14 as compared to the track speed at the outer track zone 18. Because of the large diameter of disk the velocity of the outer trck zone 18 moving underneath the recording head would be quite large and would drag along the air layer overlaying it. This would tend to lift the recording head up slightly because of the air which is being drug along on the surface of the magnetic recording disk 10 such that at the outer track zone 18 the recording head actually lifts up from the surface of the magnetic recording disk 10 slightly with respect to when it is located over either the intermediate track 16 or the inner track zone 14. Because of the increased distance between the recording layer 48 and the recording head in these large diameter disks reducing the thickness of the recording layer 48 at the outer track zone 18 as is depicted in FIG. 7 results in a more uniform output of the magnetic recording disk 10.

For a magnetic recording disk 10 prepared as per the teachings of these inventions wherein the recording layer 34 is of a reduced thickens at the inner track zone 14 with respect to at least the intermediate track zone 16 the output is improved compared to conventionally prepared recording disks now known. As was noted above in a conventional prepared recording disk at about 1.5 inches from the center of the disk the output would be at about 1.5 millivolts. By constructing the recording layer 34 such that it is thinner at the inner track zone 14 the output at approximately 1.5 inches is increased from about 1.5 millivolts to over 7 millivolts. Thus the output of the inner track zone 14 compared to the intermediate track zone 16 and the outer track zone 18 is normalized to where it only varies approximately 30%. This is compared to the almost 95% variance presently achieved utilizing conventional production techniques for currently available magnetic recording disks.

To achieve these results it is only necessary to vary the thickness of the recording layer 34 between the inner track zone 14 and the intermediate track zone 16 from about 5% to 20%. Preferrably, however, the difference between the thicknesses of these two zones would be from about 10% to about 15%. As was noted previously current recording technology requires that the recording layer 34 be of a vary small dimension in the order of several micro-inches. This difference between the thicknesses of the inner track zone 14 and the intermediate track zone 16 can easily be achieved by the utilization of the above noted contact with an anodic metal to create an area of positive charge on the partially formed disk prior to the depositing of the recording layer thereon.

FIGS. 4 and 5 show two alternate possible ways of introducing this positive charge onto the partially formed disk. In FIG. 4 the partially formed disk 50 is shown suspended on a triangular formed mandrel 52. In this instance the mandrel 52 contacts the partially formed disk 50 at three points of contact instead of in a continous contact as is seen in FIG. 3. No matter whether or not a continous contact or one or more multiple points of contacts are made as is seen in FIG. 4 an area of positive charge 54 is induced onto the partially formed disk 52 such that during depositing of a recording layer thereon initiation of depositing at the area of positive charge 54 is retarded with respect to initiation of depositing of the recording layer at the other areas not so positively charged.

In FIG. 5 an alternate way of inducing a positive charge onto a partially formed disk 56 is shown. The partially formed disk 56 has been overlayed with at least one layer such as a layer 58 which could be a shield layer, a combination magnetic layer or shield layer or the like equivilent to layers 30 and 32 previously discussed. In any event a layer 58 which is metallic in nature is located on the partially formed disk 56. This layer 58 would have been overlayed onto a substrate such as an aluminum substrate as previously described. A small opening 60 is formed through the layer 58 to expose a portion of the substrate 62 through the opening 60. With the exposure of the substrate 62 an electronic couple can now be made between the substrate 62 and the outside surface of the layer 58 which induces a positive charge area 64 onto the layer 58 around the opening 60 of the disk 56. In this instance the substrate 62 is serving as the anodic metal to induce the positive charge 64. Now when the partially formed disk 56 is introduced into a solution suitable for electroless depositing of a recording layer thereon the positive charge area 64 induced onto the layer 58 by the electric couple passing through the opening 60 between the layer 58 and the substrate 62 retards initial depositing of the recording layer at the positive charge area 64.

As described in the previous paragraph the use of the external mandrel or the like as the anodic metal to create the positive charge is not necessary. The substrate located inside of the partially formed disk 56 itself serves as this anodic metal. Since the substrate of the partially formed disk 56 is normally formed of aluminum or aluminum coated zinc this substrate would be more electro-positive with respect to a typical recording layer such as a cobalt layer and the variability in the thickness of the depositing of the recording layer upon the partially formed disk 56 would be achieved.

In addition to locating an opening such as opening 60 near the center 66 of a partially formed disk 56 an additional opening (not numbered or shown) could also be located near the outer track zone of a partially formed disk to also induce a positive charge at those areas which underlay the outer track zone such that the recording layer deposited at the outer track zone would also be thinner than other portions of the recording layer such as the intermediate track zone.

I claim:

1. A process of preparing a magnetic recording disk which comprises:
   electrolessly depositing upon a disk shaped substrate a metal containing non-recording support layer;
   contacting said support layer with an anodic metal, said anodic metal comprising a metal which is more electro-positive than cobalt, said support layer contacted at an area proximal to that area which will underlay the inner track zone of said recording disk, said contact with said anodic material producing an area of positive charge at said area of said support layer which will underlay said inner track zone;
   electrolessly depositing upon said support layer a cobalt containing recording layer, the thickness of said cobalt containing recording layer at said area of positive charge being less than the thickness of said cobalt containing recording layer overlaying the remainder of said support layer.

2. The process of claim 1 wherein:
   said depositing of said recording layer is inhibited at said area of positive charge such that the thickness of said recording layer deposited at said area of positive charge is from about 5% to about 20% less than the thickness of the remainder of said recording layer.

3. The process of claim 2 wherein:
   said thickness of said recording layer deposited at said area of positive charge is from about 10% to about 15% less than the thickness of the remainder of said recording layer.

4. The process of claim 3 including:

said substrate disk having a central opening;

said anodic metal shaped as a mandrel capable of fitting into said central opening in said substrate disk and contacting said central opening to produce said area of positive charge about said central opening;

locating said substrate disk containing said support layer on said mandrel to produce said area of positive charge prior to depositing said recording layer on said support layer.

5. The process of claim 4 including:

electrolessly depositing a further layer onto said recording layer.

6. The process of claim 3 including:

forming said substrate disk from said anodic metal;

forming said support layer to include a discontinuity in said support layer to expose said anodic metal substrate disk at said discontinuity to create said area of positive charge proximal to said discontinuity in said support layer.

* * * * *